United States Patent
Pierce

[19]

[11] Patent Number: 5,944,057
[45] Date of Patent: Aug. 31, 1999

[54] BORE PLUG AND BORE PLUGGING METHOD

[76] Inventor: David Bland Pierce, 344 Sutton Rd., Walsall, United Kingdom, WS5 3B3

[21] Appl. No.: 09/095,878

[22] Filed: Jun. 10, 1998

[30] Foreign Application Priority Data

Jun. 10, 1997 [GB] United Kingdom .................. 9711872

[51] Int. Cl.⁶ .................................................. F16L 55/00
[52] U.S. Cl. ...................... 138/89; 138/90; 220/DIG. 19; 220/796; 215/358
[58] Field of Search ............................ 138/89, 89.1–89.4; 220/DIG. 19, 796, 801; 215/355, 358, 361, 364, 294

[56] References Cited

U.S. PATENT DOCUMENTS

| | | | |
|---|---|---|---|
| 1,138,764 | 5/1915 | Kline ........................................ 215/358 |
| 2,155,491 | 4/1939 | Jacobs ....................................... 138/89 |
| 2,363,592 | 11/1944 | Hunter ........................ 220/DIG. 19 X |
| 3,358,869 | 12/1967 | Palmer et al. ........................... 220/24.5 |
| 4,113,006 | 9/1978 | Clapp ........................................ 165/76 |
| 4,202,463 | 5/1980 | Mogler ........................ 220/DIG. 19 X |
| 4,600,036 | 7/1986 | Noe ........................................... 138/89 |
| 4,653,540 | 3/1987 | Epstein ...................................... 138/89 |
| 4,760,868 | 8/1988 | Saxon ........................................ 138/89 |
| 4,809,872 | 3/1989 | Pavur ........................... 220/DIG. 19 X |
| 4,826,029 | 5/1989 | Skoglie ................................. 215/355 X |
| 4,867,333 | 9/1989 | Kolp, Jr. et al. ...................... 220/801 X |
| 5,370,252 | 12/1994 | Parsons et al. ...................... 215/355 X |
| 5,636,757 | 6/1997 | Porvaznik .................... 220/DIG. 19 X |
| 5,779,085 | 7/1998 | Havlinek et al. .................... 215/361 X |

FOREIGN PATENT DOCUMENTS

| | | | |
|---|---|---|---|
| 1194722 | 6/1965 | Germany ................................ 215/361 |
| 1518425 | 7/1978 | United Kingdom ............ F16L 55/12 |
| 1563762 | 4/1980 | United Kingdom ............ F16L 55/12 |
| 1593379 | 7/1981 | United Kingdom ............ F16B 37/04 |
| 2218177 | 11/1989 | United Kingdom ............ F16L 55/10 |

*Primary Examiner*—Patrick Brinson
*Attorney, Agent, or Firm*—Ken J. Pedersen; Barbara S. Pedersen

[57] ABSTRACT

This invention relates to a bore plug and to a bore plugging method, usually but not necessarily for tubes, and has particular (but not exclusive) application for the isolation of defective heat exchanger tubes. The bore plug comprises a sealing member and a holding member, the sealing member being adapted to span the bore, the sealing member having a longitudinal axis and an axial opening to receive the holding member, the holding member being insertable into the opening solely by axial movement. The method includes the steps of {i} pushing the sealing member axially into the bore, and {ii} pushing a holding member axially into the opening so as to urge part of the sealing member into sealing engagement with an inner surface of the bore.

11 Claims, 3 Drawing Sheets

BORE PLUG AND BORE PLUGGING METHOD

This invention relates to a bore plug and to a bore plugging method, usually but not necessarily for tubes, and has particular (but not exclusive) application for the isolation of defective heat exchanger tubes.

Thus we believe that a bore plug according to the invention will find its greatest utility for the temporary plugging of an end of a defective tube of a land or marine heat exchanger, and it is to such use that the following description is directed.

BACKGROUND TO THE INVENTION

Heat exchangers are widely used, for instance in the power supply and chemical industries, and for marine applications. A plurality of tubes, typically linear, are mounted in tube plates, being connected in parallel between "headers" so as to carry heat exchanger fluid, though heat exchangers are known with a single header and "U" shaped tubes.

Generally, the tubes will carry the coolant, typically air or water (perhaps sea water), and the fluid which is to be cooled is circulated around the tubes,.

If one or more of the tubes develops a leak, with leakage of the fluid being cooled, for example hot oil, into the coolant, then to prevent the oil being discharged with the coolant e.g. for marine applications into the sea, each defective tube needs to be taken out of service (by being "plugged"), for instance until the ship reaches port and the tube can be replaced.

Heat exchanger tubes conventionally have thin walls in order to maximise heat transfer. Such thin walls require special care to prevent damage by the fitted tube plug. Following prolonged heat exchanger use, the terminal end of a tube (and the area immediately inwards of this terminal end) can become non-uniform, by one or more of erosion, corrosion and contaminant build-up, making it difficult to ensure effective sealing.

DISCLOSURE OF THE PRIOR ART

It has long been known to isolate a tube in a heat exchanger by the insertion of a plug into one or both ends of the defective tube.

One arrangement uses a tube plug of frusto-conical form, perhaps a tapered wedge of metal or other rigid material, the plug having at least one peripheral surface of a size to span the tube i.e. so that when forced into the tube the plug will grip an inner terminal surface of the tube; when so gripping, the plug can act both to seal the "outer" leakage path between an outer periphery of the plug and the inner terminal surface of the tube, and to provide a frictional resistance to ejection of the plug from the tube —for instance upon an increase in the internal pressure in the tube. However, the force necessary for effective securement of the plug can damage the tube end (and specifically the terminal surface), especially if this terminal surface is not supported by a tube plate. The plug is usually "hammered home" and thus requires sufficient space for the hammering action, since if the plug is not firmly secured, or if it can work loose e.g. under marine vibrations, the plug can be ejected from the end of the tube, and this may not be noticed until there has been substantial leakage of the fluid being cooled.

An arrangement using a resilient plug (of plastics material) and having a separate holding means for the plug inwardly of the tube terminal surface is disclosed in British Patent 1,593,379. The arrangement is not intended as a tube plug, but may in certain circumstances function as such. The holding means is a nut of special form which accepts a threaded bolt; once inserted into the tube the nut may be difficult or even impossible to remove, so presenting a permanent flow restriction if the tube is subsequently repaired. In addition, the plug is annular, with therefore an additional potential leakage path for pressurised fluid to escape from within the tube.

A number of plug designs have been taught in which the sealing means is fitted inwards of the terminal end of the tube to be sealed, with holding means to secure the tube plug within the tube. Amongst these are the plugs as disclosed in GB patents 1,518,425 and 1,563,762. In these designs, a sleeve is firstly positioned within the bore, after which a sealing material is injected; the effectiveness of the sealing is in part dependent upon the flowability of the sealant and in part upon the provision of an adequate flow path for the sealant. The requirement for the additional step of sealant injection is time consuming and awkward, and this step may therefore not always be carried out correctly. The plugs have an annular holding sleeve, with therefore an additional "inner" internal leakage path.

Another arrangement is that of U.S. Pat. No. 4,600,036 disclosing embodiments wherein sealing members in the form of resiliently deformable O-rings providing "small area" sealing, and combination sealing and holding. In the latter of these designs there is disclosed an annular tube plug embracing a spindle, part of the spindle being threaded to receive a nut, such that upon rotation of the nut and consequent axial movement of the nut along the threaded spindle, the holding means is expanded into secure engagement with an internal bore of the tube.

It will be understood that the tube plugs according to these prior patents, and other similar designs utilising holding means and annular selling members, suffer from the disadvantage that there is a potential leakage path for pressurised fluid both to the outside of the annular sealing member (i.e. between the sealing member an the inner surface of the tube), and also to the inside of the sealing member (i.e. between the sealing member and the spindle). Furthermore, such tube plugs are more expensive to manufacture than the solid frusto-conical tube plug and yet may not always provide adequate sealing, requiring axial compression of the sealing member to cause its radial expansion into engagement with the tube. In order to ensure effective sealing, the inside of the tube typically initially requires cleaning, e.g. with a wire brush, to remove any contaminants which might otherwise interfere with the sealing member. Clearly, the requirement for a clean and uniform inner surface of the tube is greater for tube plugs employing "small area" sealing members. The known designs described above require the tube to be cleaned for a considerable length (corresponding to the length of the fitted tube plug), increasing the time and difficulty of fitting such a tube plug. Sometimes, the tube is inadequately cleaned, or is cleaned for an insufficient length, so that the tube plug provides only a partial seal, or provides an effective seal for only a short period of time, in both cases requiring further remedial work once the continued leakage is discovered.

UK patent application 2,218,177A teaches a tube plug comprising a sealing member adapted to span the tube, and a holding means comprising an eccentric ring engageable with the inner surface of a tube upon relative rotation of the sealing member and the ring. However, the ring is indicated to be partially effective only, so that further holding means are required, both to prevent rotation of the plug within the bore on tightening of the plug, and also to prevent ejection of the plug from the tube. The second holding means is provided by the sealing member which is forced into engagement with the tube as a threaded tapered holding member is screwed into a threaded opening in the sealing member. A first disadvantage of this design is that the ring is positioned inwardly of the tube relative to the sealing member, and the sealing member can be engaged with the tube bore only after the ring has itself been engaged. The sealing member can only be engaged with the tube if rotation of the ring is resisted by the tube, specifically by a tube internal irregularity such as a build-up of scale at the holding position(s) within the tube, so that operation of the plug may be unreliable. In particular, it is necessary to clean the tube adjacent the position at which the sealing member (the further holding means) engages the tube, but to leave the tube relatively uncleaned adjacent the position at which the ring engages the tube, so that considerable care in cleaning the tube prior to fitment of this particular tube plug is required. Another disadvantage is that the sealing member is desired to deform to provide an effective seal and yet be sufficiently rigid to receive the threaded holding member. The need for the sealing member to receive and cooperate with the threaded holding member requires it to be made of a substantially rigid material; a resiliently deformable material more suited to sealing cannot be used, so that sealing performance is impaired.

SUMMARY OF THE INVENTION

We seek to provide a bore plug and especially a tube plug which avoids or reduces the disadvantages of the above mentioned designs. Our bore plug has a sealing member which is continuous across the bore to be sealed and so does not share the major disadvantage of the prior designs in which an annular sealing member provides a second leakage path. Our design requires fewer components than the prior designs, and thus can be easier and cheaper to manufacture. Furthermore, our design is of smaller axial length than many of the prior designs and so a shorter length of the tube requires to be cleaned prior to insertion of the plug.

In addition, our bore plug can provide more effective and reliable bore sealing than is often achieved with the frusto-conical plug relying upon the friction grip of a tightly fitted sealing member. Furthermore, our bore plug can utilise a sealing member of a resiliently deformable material chosen for its sealing properties i.e. the sealing member is not required to be rigid to receive a threaded holding member or the like. Our design has been shown to be holdable securely in position against internal tube pressures exceeding those required in most land and marine heat exchanger applications.

Thus according to one feature of our invention we provide a bore plug comprising a sealing member and a holding member, the sealing member being adapted to span the bore, the sealing member having a longitudinal axis and an axial opening to receive the holding member, the holding member being insertable into the opening solely by axial movement.

The sealing member is initially a sliding or interference fit within the bore; the holding member expands the sealing member into sealing engagement with the bore. Because the sealing member is urged into sealing engagement with the bore for approximately the full length of the holding member, the area of sealing contact between the sealing member and the bore is significantly greater than the prior art designs incorporating small area sealing.

Thus, we have realised that it is possible to achieve good bore sealing, capable of withstanding high pressures, without the need for large holding forces which are achievable only with threaded connections. The holding member according to the invention is not threaded, and is inserted into the opening of the sealing member by axial movement alone; accordingly, the sealing member is not required to be threaded, and the material of which it is made can be readily deformable and chosen for its ability to provide a good seal.

According to a further feature of the invention, therefore, we provide a method of plugging a bore such as a tube including the steps of {i} pushing the sealing member of a bore plug as defined herein axially into the bore, the sealing member having an exposed opening, and {ii} pushing a holding member axially into the opening so as to urge part of the sealing member into sealing engagement with an inner surface of the bore.

The sealing member has a first end and a second end and preferably has a transverse partition between its ends, the sealing member having a first opening to one side of the partition (to receive the holding member) and usefully a second opening to the other side of the partition. The second opening is open to the interior of the bore or tube in the fitted condition of the plug.

Since the second opening is open to the tube in the fitted condition it becomes filled with fluid at the pressure within the tube; the wall of the sealing member surrounding the second opening is thus urged into engagement with the tube, adding to the effectiveness of the seal therebetween.

Preferably, the partition is not planar, and includes an upstand projecting into the second opening. Pressure from within the tube upon the upstand acts to urge the sealing member (and in particular the periphery of the sealing member adjacent the partition) into greater engagement with the tube wall, so increasing the effectiveness of the seal therebetween.

Usefully, the upstand is on or close to the longitudinal axis of the sealing member. Usefully also, the area of the partition surrounding the upstand is concave towards the second opening. It has been found that such a concave partition increases the sealing effectiveness of the bore plug.

Preferably, the wall surrounding the second opening is externally tapered, to assist with insertion of the plug into the bore. Preferably also, when the plug has been fitted into the bore of a heat exchanger tube, the wall surrounding the second opening will extend beyond the expanded end portion of the tube, so that the tapered exterior of the wall surrounding the second opening is in engagement with the (narrowed) tube wall.

Preferably, the wall surrounding the second opening terminates in a sharp edge at the second end of the sealing member, so that the second end provides a small area against which the pressure of fluid within the bore can act.

Usefully, the sealing member is resilient.

The first opening may be tapered. The first opening may also have a number of indentations and receive a holding member having at least one projection. The projection can locate in an indentation to provide a detent position for the holding member relative to the sealing member, resisting any tendency of the holding member to be urged out of the opening.

Desirably, the holding member has a threaded aperture to receive a threaded tool adapted to remove the holding member from the sealing member.

A particular advantage of our design is its relatively short length. Typically, all the tubes of the heat exchanger will have had at least one end mechanically expanded into tight contact with a common tube plate, and being of relatively short length the bore plug of the invention can be mostly accommodated in such expanded end i.e. typically only the wall surrouding the second opening will need to accommodate the reduction in diameter of the tube which occurs inwardly of the expanded portion. As above indicated, however, the fact that the wall can extend into the non-expanded part of the tube is an advantage in that the tapered outer wall can engage the tube beyond the expanded portion. Also, prior to fitment of a bore plug according to the invention, only the expanded portion and a short length of the tube therebeyond needs to be cleaned, so considerably reducing the time and difficultly of the tube plugging operation.

Another advantage of our invention is that the sealing member can be effective for substantially its full length. Thus, part of the sealing member is expanded into sealing contact with the bore by the holding member; part is in sealing contact by virtue of the action of the partition, and part is in sealing contact because of the pressure of fluid within the second opening. Accordingly, the sealing member is better able to accommodate any imperfections which remain on the tube wall after the cleaning operation.

Holding members with different outside diameters can be provided to take account of slightly different bore internal diameters, perhaps caused by differing amounts of erosion and/or corrosion of the bore. Thus, the bore plug manufacturer does not need to know the precise inside diameter of the bore, since a given sealing member is sufficiently deformable (expandable) to seal bores of slightly differing inside diameters depending upon the outside diameter of the holding member which is pushed thereinto, i.e. the bore plug fitter can choose to fit the holding member required to provide the desired sealing for the particular bore.

Additionally therefore, there is provided a sizing ring having a number of differently sized projections thereon. In one method of fitment according to the invention, a sealing member as herein defined is chosen for the size of bore, and is fitted into the bore. Respective projections of the sizing ring are sequentially pushed manually into the first opening until the projection causing an interference fit is determined. The projections will correspond to certain diameter holding members, so that the holding member corresponding to the determined projection can thereafter be inserted into the opening to seal the bore.

It will be understood that the bare plug according to the invention does not require the large positioning forces which in certain of the prior art tube plugs was provided by rotation of a nut on the threaded spindle; rather, the bore plug of the invention can be inserted into the bore in its unstressed condition, and then be clamped in position inside the tube simply by pushing manually a holding member axially into the sealing member. Thus, cooperating threads are not required, so saving on manufacturing cost. Also, fitment tools (perhaps specialised) are not required, so saving on fitting time and difficulty.

Notwithstanding the ease of fitment, analysis has demonstrated that the bore plug of the invention when fitted into a tube of a heat exchanger can seal against and hold against internal tube pressures in excess of 1000 p.s.i. (approximately $7 \times 10^6$ Pa).

Tests have also shown that removal of the the holding member permits the bore plug readily to be removed from the bore, so that the bore plug according to the invention is generally re-usable.

Usually the bore is circular in cross-section (which is typically the case for the tubes of land and marine heat exchangers, for example), so that the outer surface of the sealing member is also circular, but other bore cross-sections can be accommodated by sealing members with correspondingly shaped outer surfaces.

As above indicated, whilst it has been found that the engagement between the (deformable) material of the sealing member and the tube is sufficient to resist forcing out of the tube plug under the pressures typically acting in land and marine heat exchangers, additional holding means can be provided if required. Thus, alternatively the sealing member can carry a holding means, the holding means being of a different material to the sealing member and being movable into a bore-engaging condition by the holding member.

The holding means can be of a harder material than the sealing member, and thus be suited to holding engagement with the bore so as to resist movement of the plug along the longitudinal axis of the bore.

Usefully, the holding means comprises a plurality of independent holding plates. In one embodiment the holding plates can move relative to the sealing member, but in another embodiment will be fixed thereto such as to be movable into holding engagement with the tube simultaneously with sealing engagement with the tube by the sealing member.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
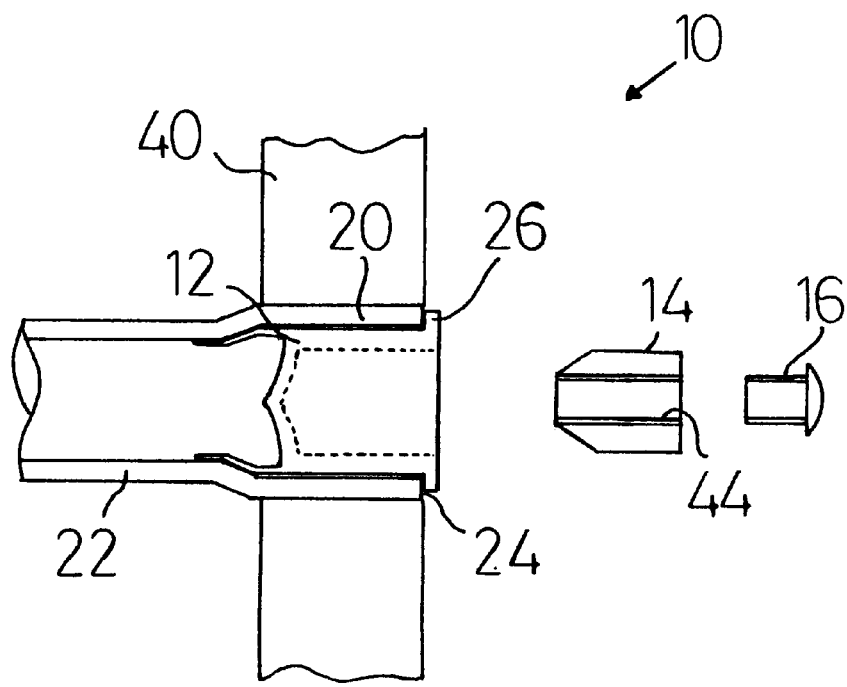
FIG. 1 is a sectional side view of the parts of a bore plug according to the invention, the sealing member being fitted into the end of a heat exchanger tube.

The bore plug 10 of FIG. 1 comprises a sealing member 12, holding member 14, and protective cap 16.

The sealing member 12 is of resiliently deformable material, chosen for its sealing properties. In this embodiment the sealing member 12 is of "Hysil", chosen for its ability to withstand operating temperatures in the range encountered in the application concerned, though other elastomeric materials including fluoro-elastomers, polyurethane, rubber, "Nulex", "Nitrile", or "Viton" could be used, suited to the particular application and the range of temperatures which the bore plug will encounter in use; for land and marine heat exchangers, the bore plug should be able to withstand operating temperatures typically up to 150° C., and perhaps up to 200° C.

The sealing member 12 is selected to be of an outside diameter which is a sliding or interference fit in the expanded and 20 of the tube 22 into which it is adapted to be secured, so that it can be manually pushed into the tube until its second part or flange 26 abuts the tube annular end surface 24. The spacing between the outer surface 28 (FIG. 2) of the sealing member 12 and the inner surface of the enlarged portion 20 of the tube is exaggerated in FIG. 1, for clarity; in practice the sealing member will preferably be a sliding or interference fit within the tube, so that there will be little or no gap between these parts.

In practice, the degree of expansion utilised by heat exchanger manufacturers is approximately consistent, so that the manufacturer of the bore plug will know the size of bore plug which is necessary if he is told the nominal (i.e. unexpanded) diameter and wall thickness of the tube.

Figure 2:
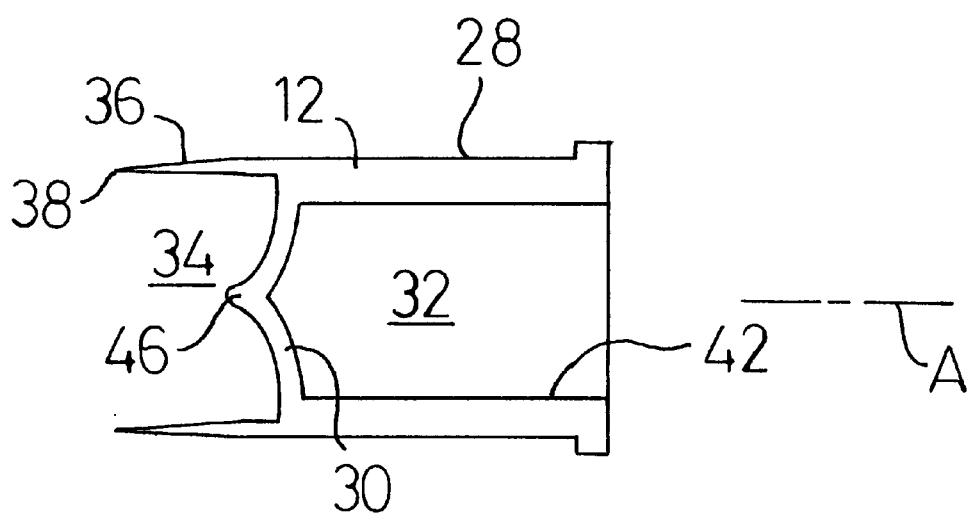
FIG. 2 is a sectional side view of part of the sealing member of FIG. 1.

As shown in FIG. 2, the sealing member 12 has a partition 30 arranged between its ends. To one side of the partition 30 is the first opening 32 which is adapted to receive the holding member 14. To the other side of the partition 30 is second opening 34 which in the fitted condition of FIG. 1 is open to the interior of the tube 22.

Surrounding the second opening 34 is an annular wall 36. The wall 36 has an outer surface which tapers towards the second end 38 of the sealing member. The tapering outer surface facilitates ease of insertion of the sealing member 12 into the tube end 20.

Notwithstanding the tapered outer surface of the wall 36, however, the outer surface is sized to engage the tube for which it is intended beyond the enlarged region 20, as seen in FIG. 1, and is thus able to provide a seal therewith.

Tube plate 40 of a heat exchanger supports a number of heat exchanger tubes in parallel, each tube 22 during manufacture of the heat exchanger having had its end 20 mechanically expanded in known fashion so as to form a tight mechanical bond with the tube plate 40. A particular advantage of the bore plug 10 is its relatively short axial length, so that when its flanged end 26 engages the end 24 of the tube the body of the bore plug is accommodated in the enlarged portion 20 of the tube 22 and only the wall 36 extends therebeyond.

The annular wall of the opening 32 has an inside surface 42 which is smooth, and which in this embodiment is parallel to the longitudinal axis A of the sealing member. Thus, the opening can receive smooth-sided holding member 14. The outer diameter of the holding member 14 is slightly larger than the diameter of the surface 42, so that on pushing of the holding member 14 fully into the opening 32 part of the sealing member is expanded so that its outer surface 28 is forced into greater engagement with the expanded end 20 of the tube, to form a seal therewith.

Despite the holding member 14 being of greater outer diameter than the diameter of the surface 42 of the opening 32, the holding member can usually be pushed thereinto by hand or finger pressure with sufficient force to expand the sealing member as required. Thus, it is foreseen than no tools will be required to fit the bore plug.

The holding member 14 has a threaded aperture 44, adapted to receive a threaded tool to assist in the removal of holding member 14 from the sealing member 12, as may be required when the defective tube 22 is to be replaced. The aperture receives cap 16 which prevents the ingress of dirt and debris into the aperture (prior to removal being required). The aperture 44 is continuous through the holding member, the aperture thus allowing the egress of air from within the opening 32 as the holding member is pushed thereinto.

Thus, our bore plug requires a minimum of tube cleaning prior to fitment. Furthermore, because our design requires only the axial insertion and removal of the holding member, there results both the quick and easy fitment of the bore plug and also the quick and easy removal and (subsequent reuse) of the plug, without loss of performance and with a saving in cost.

The partition 30 in this embodiment has an upstand 46 which projects into the second opening 34 of the sealing member 12. Surrounding the upstand, the partition is concave towards the second opening. It has been demonstrated that this form of partition provides enhanced sealing as compared to a planar partition, for example. Thus, when the tube 22 is fitted with a bore plug 10 and the tube is subsequently pressurised, the pressure acting on the partition 30 and upon the upstand 46 urges the sealing member, and in particular the outer surface 28 surrounding the partition, into greater contact with the tube, so increasing the effectiveness of the seal.

It has been shown in tests that a bore plug of this design, in which the holding member 14 is merely manually pushed into the opening 32, is nevertheless retained in the tube (and provides an effective seal) despite the pressure within the tube 22 being 1000 p.s.i. (approximately $7 \times 10^6$ Pa) greater than the pressure outside the tube. Such a pressure differential far exceeds the pressure differentials existing in most land and marine heat exchangers.

In an alternative embodiment, the flange 26 is omitted, so that the bore plug can be located fully within the tube and does not; protrude therefrom. This embodiment may be desirable for those applications in which for example a protruding flange may foul a part of the heat exchanger or adjacent component, or it may be desirable for aesthetic reasons. In such embodiments, it can be arranged that the bore plug is inserted until it is flush with the end of the tube, or until the wall surrounding the partition reaches the end of the expanded region of the tube and the force to insert the plug further increases noticeably.

Figure 3:
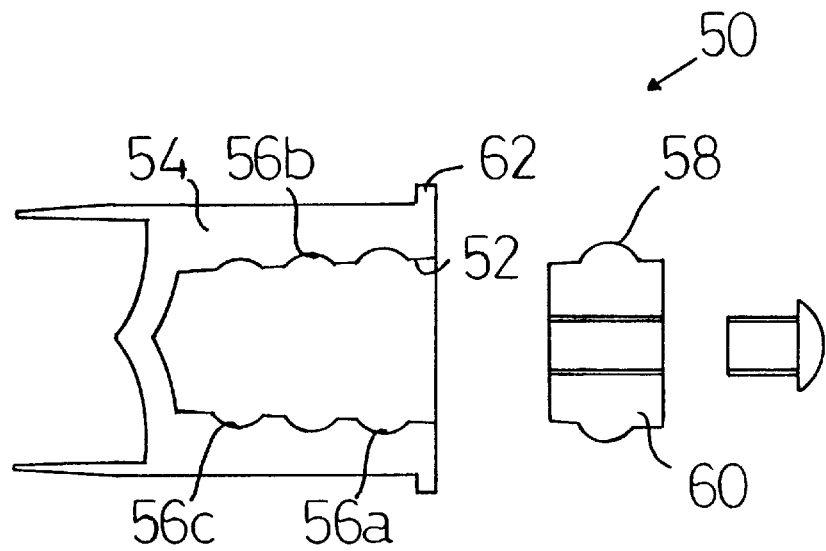
FIG. 3 is a sectional side view of the parts of another embodiment of bore plug.

FIG. 3 shows an alternative design of bore plug 50. The bore plug 50 is generally similar to the bore plug 10 of FIGS. 1 and 2, and fits into the enlarged end 20 of a tube of a heat exchanger tube 22 in the same way. However, the first opening 52 of the sealing member 54 is tapered, and includes three circumferential indentations 56a,b,c. The indentations are adapted to receive a circumferential projection 58 of the holding member 60, to provide three detent positions for the holding member.

When using the bore plug 50 of FIG. 3, the sealing member 54 is first inserted into the tube until its enlarged end 62 engages the end of the tube. The holding member 60 is then pushed into the opening 52 until the projection 58 locates in indentation 56a. If greater sealing pressure between the sealing member and the tube is required, or if the sealing member needs to be expanded more, e.g. because of extra erosion of its respective tube, the holding member 60 can be pushed further into the opening, so that the projection 58 locates in the indentation 56b or 56c. It is believed that with sufficient experience in fitting bore plugs of this type, a fitter would become aware of the manual pressure needed to insert the holding member 60 to achieve the required sealing, so that the fitter would know whether the holding member is correctly located with the projection within the indentation 56a, or whether it is necessary to push the holding member further into the opening 52. A skilled fitter would thus not need to pressurise the tube and check for any leakage in order to determine the correct relative position of the holding member 60.

In embodiments similar to FIG. 3, more or fewer indentations can be provided, as required. It may also be acceptable to have just one indentation, with the variation in the sealing force applied being provided by differently sized holding members (as is also the case with the embodiment of FIGS. 1 and 2); clearly, in such an embodiment the opening would not need to be tapered.

Figure 4:
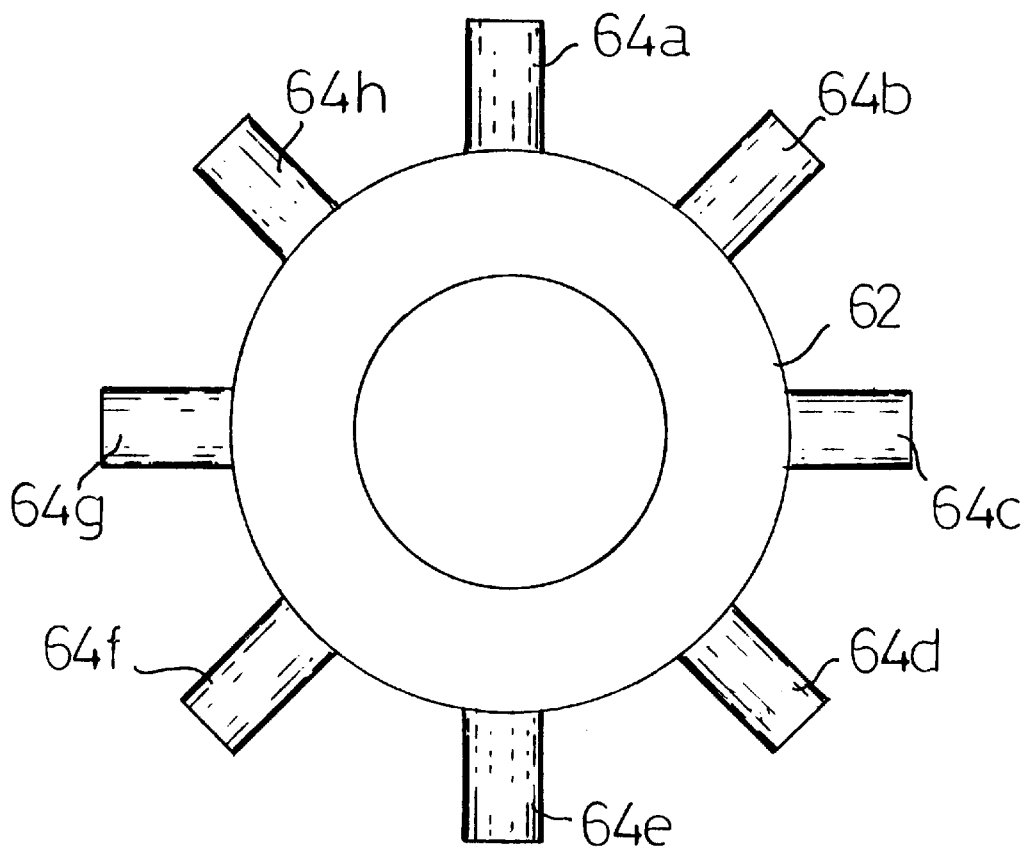
FIG. 4 is a view of a sizing ring.

FIG. 4 shows a sizing ring 62, adapted to determine the size of the holding member 14 required to be fitted into the first opening 32 of the sealing member as more fully described below. Thus, for a given tube, the actual internal diameter will be determined partly by the degree of expansion involved (which is usually fairly consistent throughout the heat exchanger industry), and also by the (variable) amount of erosion and corrosion which the tube has suffered. A given sealing member 12,50 will be able to accommodate fairly large variations in the tube inside diameter, perhaps of the order of 0.5 mm on a nominal 19.05 mm (¾ inch) tube. The expansion of the sealing member which is needed to achieve the sealing required will, however, depend upon the actual tube diameter, and in accordance with the invention this is achieved by the fitment of an appropriately sized holding member into the opening 32.

Accordingly, for use with a heat exchanger tube having a nominal outer diameter of 19.05 mm, it is envisaged that the sealing member 12 would have a first opening 42 with a non-stressed diameter of approximately 13 mm; holding members having outer diameters in the range 13.5 mm to 15 mm would be used with such a sealing member, there being many differently-sized holding members possible within this range, preferably varying by diameters of 0.5 mm, but perhaps varying by diameters of 0.2 mm if desired.

In order to determine which holding member to fit within the opening 42 to achieve the required sealing, there is provided a sizing ring 62. The sizing ring 62 has eight projections 64a–h, each differing in diameter by 0.5 mm. The sealing member 12 is fitted into the tube, and the smallest projection 64a is inserted into the opening 32. If the sealing member is expanded but does not form a tight seal with the tube, the projection 64a will slide easily in and out of the opening. Progressively larger projections 64b,64c etc. are subsequently pushed into the opening, until a projection is determined which gives an interference fit. Experience or instruction can teach a fitter the fit required so that with the determined projection the sealing member is being forced into sealing engagement with the tube.

Usefully, the projections are coded, preferably colour coded, and correspond to differently sized holding members. When the correct projection 64 has been determined, the corresponding holding member 14 can be inserted into the opening to achieve the required seal. If desired, or necessary in certain applications, the corresponding holding member can have a slightly larger diameter than the projection, so that the force necessary to push it into the opening 32 is greater than that required to push in the determined projection. Accordingly, the corresponding holding member will provide a greater seal than did the projection.

Sizing rings with more or fewer projections 64 can be provided as desired, and the size difference of the projections can vary in accordance with the variation in the diameters of the holding members, e.g. by 0.2 mm if desired. In addition, it may be necessary to provide two or more sizing rings which together have projections corresponding to all of the holding members within the range of sizes provided.

Figure 5:
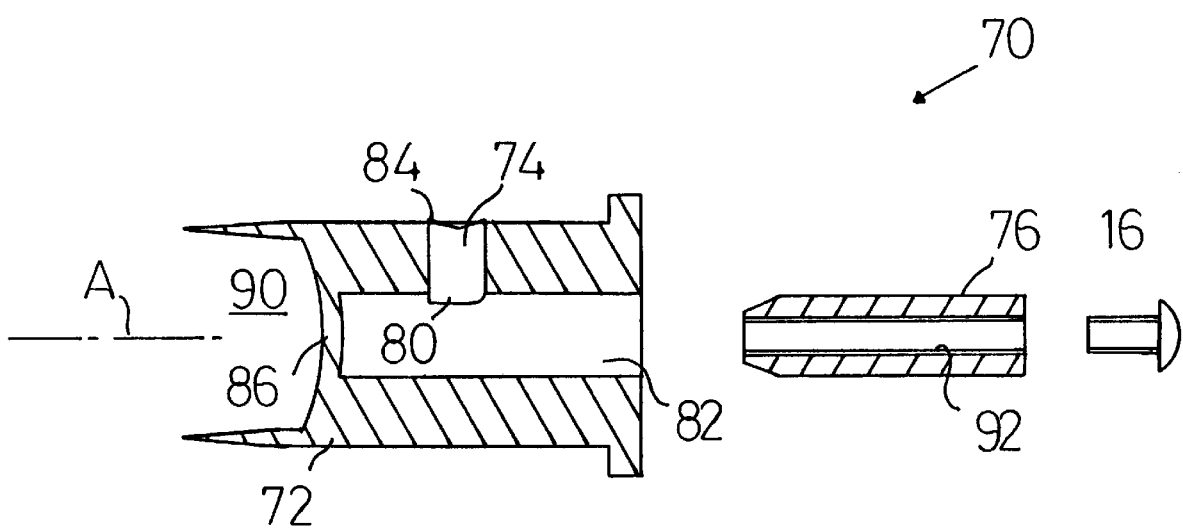
FIG. 5 is a sectional side view of an alternative embodiment of bore plug.

The tube plug 70 of FIG. 5 comprises a sealing member 72, holding means comprising separate holding plates 74 (only one of which is shown in FIG. 5), a holding member 76, and protective cap 16.

Fitment of the tube plug 70 is similar to that described for the plug 10.

The holding means in this embodiment comprises three separate holding plates 74 arranged at approximately 120° separation around the longitudinal axis "A" of the sealing member 72. Each holding plate 74 is substantially flat, and is mounted in a suitably sized opening in the sealing member 72.

In the absence of a holding member, the holding plates 74 each have a part 80 which projects into the opening 82, and the outer edge 84 thereof is approximately flush with the outer surface of the sealing member 72. When the holding member 76 is inserted into the opening 82, however, the plates 74 are pushed outwardly so that their outer edges 84 engage the inner surface of the tube.

In this embodiment the outer edges 84 are sharpened and formed into two "teeth" adapted to become slightly embedded in the tube wall, so as firmly to retain the bore plug 70 in position in the tube.

As in the embodiments of FIGS. 1, 2 and 3, the outer diameter of the holding member 76 is slightly larger than the diameter of the first opening 82 in the sealing member 72, so that on forcing of the holding member fully into the first opening, not only are the holding plates 74 forced into engagement with the inner surface of the tube, but also the sealing member is expanded so that its outer surface engages the inner surface of the tube and forms a seal therewith.

When it is desired to remove the bore plug 70 from the tube, for instance whilst the heat exchanger is being repaired, the protective cap 68 can be removed and a bolt or the like can be screwed into the bore 92 of the holding member 76 to pull the holding member 76 out of the sealing member 72. When the holding member 76 has been removed, the force with which the holding plates 74 engage the inner surface of the tube is much reduced, permitting the sealing member 72 and its holding plates 74 to be withdrawn from the tube.

It will be understood that in other embodiments more than three holding plates can be used; we have found that a greater number of holding plates increases the pressure differential which the tube plug can withstand before being forcibly ejected from the tube, so that the number of holding plates can be determined in part by the pressure differential which the tube plug will be required to withstand. In addition, the plates can be replaced by pins or fingers, having a shape and construction suited to the particular application.

The bore plug 70 differs slightly from the bore plug 10 in that the partition 86 between the first opening 82 and the second opening 90 is concave (towards the bore when fitted, i.e, the left of FIG. 5 as viewed), and does not have an upstand such as that referred to by numeral 46. In some applications, the additional security provided by the holding plates can overcome the requirement for an upstand. Clearly, however, in other embodiments a sealing member having the form of that of FIGS. 1 and 2 could incorporate holding plates such as those of FIG. 5; alternatively, in some applications it may be acceptable to use a sealing member simiar to that of FIG. 5 but without the holding plates.

The holding member 76 is longer (in the direction of the axis A) as compared to its diameter than the holding member 14 of FIG. 1; this need not be so, and in an alternative embodiment the holding member 14 can be used with a bore plug having holding means such as the plates 74.

A bore plug would typically be fitted to both ends of a leaking tube, to prevent flow both into and out of the tube. A bore plug according to the invention can be used whether it is the coolant or the working fluid which flows through the tubes. Also, the bore plug can be effective at sealing a bore carrying a gas or a liquid.

I claim:

1. A bore plug comprising a sealing member and a holding member, the sealing member being adapted to span the bore, the sealing member having a longitudinal axis and an axial opening to receive the holding member, the holding member being insertable into the axial opening solely by axial movement, the sealing member having a first end and a second end, and a continuous partition between its ends.

2. A bore plug according to claim 5 in which the sealing member has a first end and a second end, and a partition between its ends.

3. A bore plug according to claim 1 in which the axial opening is to one side of the partition, and another opening is provided on the other side of the partition.

4. A bore plug comprising a sealing member and a holding member, the sealing member being adapted to span the bore, the sealing member having a longitudinal axis and an axial opening to receive the holding member, the holding member being insertable into the axial opening solely by axial movement, the sealing member having a first end and a second end, and a continuous partition between its ends, wherein the partition is not planar.

5. A bore plug comprising a sealing member and a holding member, the sealing member being adapted to span the bore, the sealing member having a longitudinal axis and an axial opening to receive the holding member, the holding member being insertable into the axial opening solely by axial movement, the sealing member having a first end and a second end, and a continuous partition between its ends, the axial opening being to one side of the partition, and another opening being provided on the other side of the partition, said another opening being surrounded by a wall, wherein the wall is externally tapered.

6. A bore plug according to claim 1 in which the sealing member is resilient.

7. A bore plug according to claim 1 in which the sealing member is formed of one of the following materials: "Hysil", polyurethane, rubber, "Nulex", "Nitrile", "Viton" or a fluoro-elastomer.

8. A bore plug according to claim 1 in which said axial opening is tapered and has a number of indentations, and in which the holding member has at least one projection.

9. A bore plug according to claim 1 in which the sealing member carries a holding means, the holding means being of a different material to the sealing member and being movable into a bore-engaging condition by the holding member.

10. A bore plug according to claim 9 in which the holding means comprises a plurality of independent holding plates.

11. A method of plugging a bore such as a tube with a bore plug comprising a sealing member and a holding member, the sealing member being adapted to span the bore, the sealing member having a longitudinal axis, a first end, a second end, a continuous partition between the first end and the second end, and an axial opening to one side of the partition to receive the holding member, the method including the steps of {i} pushing the sealing member axially into the bore, and {ii} pushing a holding member axially into the axial opening so as to urge part of the sealing member into sealing engagement with an inner surface of the bore.

* * * * *